April 17, 1962     H. L. VANDEN HOEK     3,029,834
DAMPING MEANS FOR RELIEF VALVES
Filed March 29, 1960
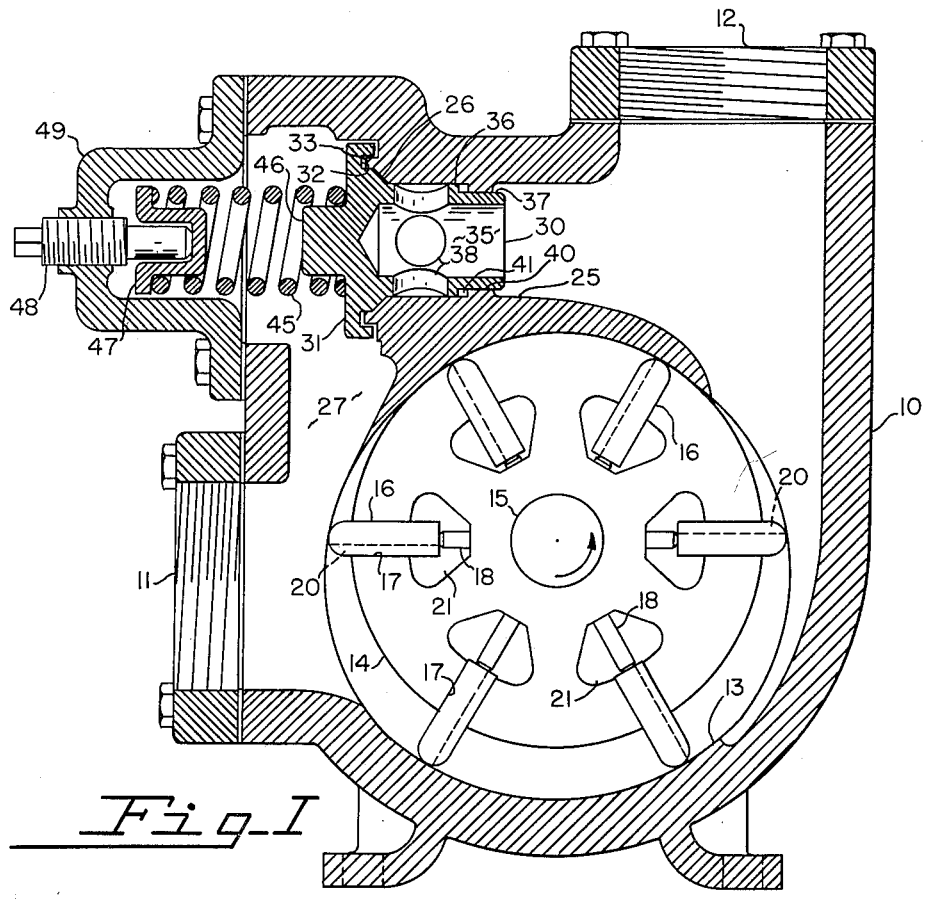
Fig. I
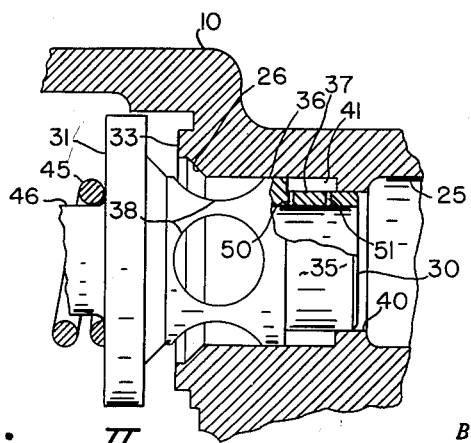
Fig. II
INVENTOR.
HAROLD L. VANDEN HOEK
BY *Marshall + Wilson*
ATTORNEYS United States Patent Office 3,029,834
Patented Apr. 17, 1962

3,029,834
DAMPING MEANS FOR RELIEF VALVES
Harold L. Vanden Hoek, Grand Rapids, Mich., assignor to Blackmer Pump Company, Grand Rapids, Mich., a corporation of Michigan
Filed Mar. 29, 1960, Ser. No. 18,274
3 Claims. (Cl. 137—514.5)

This invention relates to relief valves and in particular to a relief valve including an integrally formed dashpot serving as a snubber to prevent rapid closure of the valve and hammering of the valve on its valve seat without introducing any delay into the opening time of the valve in response to suddenly increased pressures.

Relief valves have long been used for relieving excess pressure in fluid filled systems. One common use for a relief valve is to bypass the excess delivery of a positive displacement pump during such times as the system into which the pump is discharging does not accept the full delivery of the pump. In the ordinary design of a relief valve the pressure drop across the valve as it is relieving excess pressure on its inlet side increases with the increase in flow of fluid through the valve. Thus if it requires 100 pounds per sq. in. pressure to slightly open the valve and produce an initial flow it may require as much as 110 or 120 pounds or more to open the valve to bypass the full delivery of the pump. Such a valve is stable in operation in that any change in flow rate of the valve produces a corresponding change in opening of the valve without any tendency toward hunting or overshooting such position. In other words the valve automatically immediately moves to a position at which its opening just accommodates the required flow rate.

Some relief valves for use with positive displacement pumps in certain types of delivery systems are designed so that the pressure required to open the valve and produce an initial flow through the valve is much larger than the pressure required to maintain the valve open during full flow conditions. When such a valve is used with a positive displacement pump the combination has the characteristic that the oulet pressure of the pump increases with the rate of delivery of fluid into the discharge system of the pump. This is a desirable characteristic in some delivery systems since the pressure losses in the delivery system vary with the rate of fiow and such a pump automatically compensates for such delivery line losses to maintain a substantially constant pressure at the delivery point. However, a pressure relief valve having the characteristic of decreasing its relief pressure with increase in flow through the relief valve tends to introduce pressure fluctuations by itself. This is particularly true if a pump incorporating such a relief valve is discharging into a system that has substantial elasticity such as a pressure accumulator or even a long rubber or plastic hose. In such a system as the pressure builds up as the pump delivers to the discharge system the pressure finally reaches a point at which the relief valve starts to open. As the relief valve opens and less pressure is required to increase the opening movement the fluid driven by the pressure accumulator rushes from the discharge system back through the relief valve to the inlet side of the pump. This action continues until the pressure in the discharge system drops below the low pressure required to hold the valve open. The valve then rapidly closes and the cycle repeats itself as soon as the pressure again builds up. If the discharge system has practically no elasticity, such as a rigid system that is completely liquid filled, the relief valve does not have a chance to generate pressure fluctuations because of its negative pressure-flow characteristics. However, very few systems are completely liquid filled and devoid of elasticity.

The principal object of this invention is to provide a relief valve with a simple damping arrangement that delays the closing movement of the valve and prevents the valve from pounding on its seat without interfering with a rapid opening of the valve in response to a sudden application of excess pressure.

Another object of the invention is to provide a relief valve with a simple annular dashpot that does not interfere with the valve during opening movement of the valve but which serves to cushion the closing movement of the valve.

A still further object of the invention is to provide a relief valve in which the guiding means for keeping the valve centered in its valve bore also provide a dashpot effect to prevent a rapid closure of the valve.

A still further object of the invention is to provide a simple relief valve assembly which incorporates a dashpot effect without requiring extra pieces or complicated machining of the parts.

More specific objects and advantages are provided by a relief valve constructed according to the invention.

According to the invention the improved relief valve includes a tubular portion inserted into a bore facing toward the high pressure side of the valve, such tubular portion having a stepped circular exterior that cooperates with a stepped bore to provide an annular chamber between such steps the volume of which increases with the opening of the valve and which chamber is in restricted communication with the high pressure side of the valve in order that it may function as a dashpot to control the rate of closure of the valve.

A relief valve constructed according to the invention is illustrated in the accompanying drawings.

In the drawings:

FIG. I is a vertical section of a positive displacement vane type pump incorporating the improved relief valve.

FIG. II is an enlarged vertical section of the relief valve showing the valve in its open position.

These specific figures and the accompanying description are intended merely to illustrate the invention and not to impose limitations on its scope.

The improved pressure relief valve may be built as a separate valve to be incorporated in a hydraulic or pneumatic system or it may be constructed as an integral part of a positive displacement pump. In the drawings it is shown as an integral part of a positive displacement pump. Such a pump comprises a housing 10 having an inlet port 11 and a discharge port 12. The housing 10 also includes a cylindrical bore 13 in which a rotor 14, carried on an eccentrically located shaft 15, is mounted to be substantially tangent to the bore at its uppermost portion. The rotor 14 carries a plurality of vanes 16 that are slidably mounted in slots 17 of the rotor 14 to maintain contact with the bore 13 as the rotor 14 turns. A plurality of pins 18 passing transversely through the interior of the rotor 14 and shaft 15 bear on the inner ends of the vanes 16 to urge them outwardly into contact with the bore 13. Thus as the vanes on the right hand side of the rotor 14 are being pressed radially inwardly into the rotor 14 by the converging wall of the bore 13 the opposite vanes are pushed outwardly by the rods 18 to follow the bore 13.

Each of the vanes 16 is further provided, on its leading edge, with a channel 20 that provides fluid communication to pockets 21 at the inner ends of the vanes. These channels 20 are on the leading edges of the vanes 16 so that the pressure in the chambers 21 at the base of the vanes is equal to the pressure ahead of a vane thus tending to hold or push the vanes outwardly at all times.

The discharge port 12, or rather the passage from the bore 13 to the discharge passage 12, communicates through a valve bore 25 that leads past a valve seat 26 into a return passage 27 leading to the inlet duct 11. This passage, normally closed by a valve spool 30, provides for bypassing fluid from the outlet 12 to the inlet 11 when the pump delivery exceeds the rate at which the delivery system accepts material from the pump. The valve spool 30 includes a valve disk 31 extending radially beyond the valve seat 26 and having a portion cooperating with the valve seat 26. The fluid pressure acting on the radially extending portion of the disk 31 including a groove 32 cooperating with a land 33 across which fluid must flow when the valve is open holds the valve open with reduced inlet pressure once the valve starts to open. The valve spool 30 also includes a tubular portion 35 that extends into the bore 25 and is guided therein. The exterior of the tubular portion 35 of the valve spool 30 is stepped so as to have a larger diameter portion 36 and a smaller diameter portion 37. The larger diameter portion 36 includes ports 38.

The bore 25 also includes an inwardly directed circumferentially extending step 40 that cooperates with the smaller diameter portion 37 of the valve spool 30. Thus the valve bore 25 and the exterior of the tubular portion 35 of the valve spool 30 are each stepped along their length with their cooperating portions forming close sliding fits so that an annular chamber 41 is formed between the radial faces of the offset portions and the larger diameter bore 36 and smaller diameter tubular portion 37 of the valve spool. This annular chamber increases in volume as the valve opens.

The valve is held or urged to closed position by a spring 45 that fits over a spring guide 46 formed integrally with and coaxial with the valve disk 31 and a corresponding valve spring seat 47 carried on the inner end of an adjusting screw 48 that is threaded through a cap 49 rigidly attached to the pump housing 10 in coaxial alignment with the valve 30. The valve is shown in its open position in FIG. II at which time the ports 38 permit fluid to flow from the high pressure side of the valve through the ports past the valve seat 26 across the land 33 and past the periphery of the disk 31. In this position the annular chamber 41 has expanded to its maximum volume.

This particular design of relief valve has the characteristic that the pressure required to hold the valve open at full bypassing flow rate is materially less than the pressure required to open the valve. This follows because the restriction beyond the valve seat 26 is arranged so that fluid flowing through the ports 38 and past the valve seat acts on the valve disk 31 pushing it toward the open position. When the valve is in its closed position the effective area is the area of the tubular portion 37. Since this particular cross sectional area equal to the cross sectional area of the bore 25 is much smaller than the area of the disk or the land 33 it follows that a much higher pressure is required to initially open the valve than is required to keep it in its open position.

Preferably the cross sectional area of the annular chamber 41, which determines its increase in volume per unit movement of the valve, is approximately ⅓ the cross sectional area of the valve spool 30. As the pressure rises in the discharge side 12 of the pump it reaches the pressure at which the valve is set to open, that being the pressure which when acting on the tubular end of the valve spool equals the force exerted by the spring 45. The opening movement of the valve reduces the pressure in the annular chamber. Since this pressure cannot be reduced below a vacuum no more than a maximum of five pounds per square inch pressure on the valve is required to overcome the dashpot effect during initial opening of the valve.

As an example, assume that there is a pressure of approximately 100 pounds per square inch on the discharge side of the pump. Then a pressure difference of 100 to 115 pounds per square inch exists across the step 40 tending to drive fluid through the clearance space between the valve spool portion 37 and the step and into the annular chamber 41. This flow of fluid tends to relieve the vacuum in the annular chamber. After the flow rate through the bypass valve or relief valve has been established and the valve is in its more or less open position the annular chamber fills with liquid or fluid which must be exhausted before the valve can reclose. On the reclosing movement, because of the high pressure that is generated in the annular chamber, the valve cannot close rapidly but is limited in its closing velocity by the rate at which the fluid in the annular chamber 41 can be exhausted through the clearance spaces between the valve spool and the valve bore.

Among the many advantages provided by this design of controlled relief valve are the simplicity of design in that it involves only one moving part in addition to the spring and no unusual machining operations are required to manufacture the parts. The valve spool 30 is made by a relative simple turning operation followed by cross drilling to provide the ports 38. The valve bore, in which the valve spool slides, may also be easily drilled and reamed by step reamers to provide not only a close sliding fit for the valve spool but also exact concentricity of the various surfaces so that the spool, even though a close fit, still will not bind in the bore. The axial length of the improved valve including the section containing the ports 38 and the reduced diameter portion provides adequate axial support to prevent any twisting or cocking of the valve in the bore which would interfere with its smooth operation.

If the sliding fit of the pieces cooperating to form the annular chamber 41 has insufficient clearance to transfer the proper quantity of fluid into and from the annular chamber, bleed holes such as hole 50 or an alternate hole 51, FIG. II, may be included. The hole 50 may be arranged as shown in FIG. II so as to be effective at all times or it may be replaced by the alternate bleed hole 51 that is exposed only when the valve is open to readily admit fluid into the annular chamber 41 when the valve is open but to prevent the easy flow of fluid from the chamber as the valve approaches its closed position.

In lieu of the opening 51 grooves may be cut in the exterior of the small diameter portion 37 of the valve spool 30 to increase the clearance or reduce the restriction from the inlet side of the valve to the annular chamber.

This valve thus displays the desirable characteristics of having a slow controlled closing rate for protection of the valve seat against hammering and elimination of noise and having a very rapid opening rate in response to excess pressure. The improved valve thus provides a quiet pressure control for a positive displacement pump or similar uses.

Various modifications may be made in the particular design and construction of the improved valve without losing the advantages of incorporating an annular expansible chamber in the design of the valve to serve as a dashpot in controlling the action of the valve.

Having described the invention, I claim:

1. In a relief valve structure for a pump, in combination, a valve having in the direction of fluid flow through the valve a first cylindrical bore, a coaxial second cylindrical bore of larger diameter than said first said bore, and a valve seat concentric with said bores and of larger diameter than the second bore, a hollow valve spool having a tubular portion including a first section slidable in the first cylindrical bore, a ported second section slidable in the second cylindrical bore and a valve disk that cooperates with and overhangs the valve seat, said first and second bore and spool sections forming therebetween an annular chamber that is in restricted communication with the up stream side of the valve and that expands as the valve opens, and resilient means urging the valve toward its closed position.

2. In a relief valve structure, in combination, a valve body having in coaxial alignment in order in the direction of flow through the valve body a first cylindrical bore, a second cylindrical bore of larger diameter than the first, and a valve seat of larger diameter than the second bore; a hollow valve spool having parts opening to the second bore, said spool having an exteriorly stepped surface slidably fitting said cylindrical bores and a valve disk that cooperates with and overhangs the valve seat, said stepped surface and said cylindrical bores forming an annular chamber upstream of the valve seat that increases in volume as the valve opens, said stepped surfaces and bores having clearance to allow limited transfer of liquid between the annular chamber and the upstream side of the valve, and resilient means urging the valve toward its closed position.

3. In a relief valve structure, in combination, a valve body having a valve seat and a stepped bore coaxial with and of smaller diameter than the valve seat, a hollow valve spool having a valve surface co-operating with the valve seat and a smaller diameter ported stepped tubular portion directed to the high pressure side of the valve and slidable in the stepped bore and co-operating therewith to form an annular chamber that increases in volume as the valve opens, said chamber having restricted ingress and egress passages opening to the high pressure side of the valve whereby it functions as a dashpot to oppose movement of the valve spool with respect to the valve body, and resilient means urging the valve toward its closed position.

References Cited in the file of this patent
UNITED STATES PATENTS

| | | |
|---|---|---|
| 955,043 | Barr et al. | Apr. 12, 1910 |
| 2,287,840 | Stratton | June 30, 1942 |
| 2,318,963 | Parker | May 11, 1943 |

UNITED STATES PATENT OFFICE
CERTIFICATE OF CORRECTION

Patent No. 3,029,834                      April 17, 1962

Harold L. Vanden Hoek

It is hereby certified that error appears in the above numbered patent requiring correction and that the said Letters Patent should read as corrected below.

Column 5, line 8, for "parts" read -- ports --.

Signed and sealed this 4th day of September 1962.

(SEAL)
Attest:

ERNEST W. SWIDER                      DAVID L. LADD
Attesting Officer                      Commissioner of Patents